Patented Oct. 4, 1927.

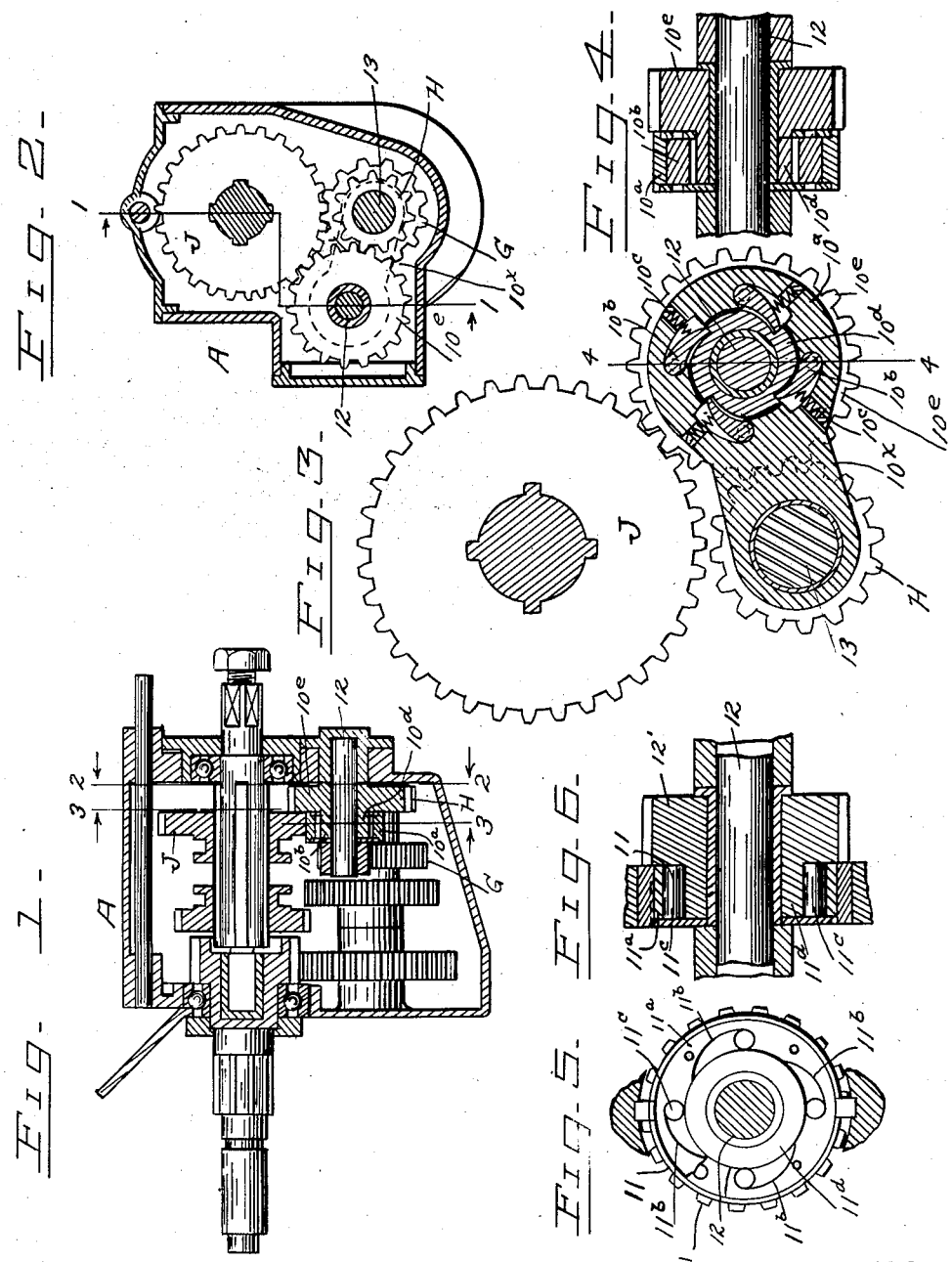

1,643,989

UNITED STATES PATENT OFFICE.

GEORGE E. LYNCH, OF LOS ANGELES, CALIFORNIA.

SAFETY DEVICE FOR MOTOR CARS.

Application filed August 14, 1922. Serial No. 581,351.

The principal object of my invention is to promote the safety of automobile and truck driving by confining the movement of the vehicle to the direction determined by the setting of the gear lever. It is applicable to all classes of engine or motor driven vehicles using the spur gear type of transmission.

My invention is based on the fact that in all transmissions of the spur gear type, certain shafts and gears rotate invariably in the same direction under all normal movements of the bar. This includes the clutch gear and its shaft, the countershaft and gears, and the reverse idler. The only time that any member of this train reverses its direction of rotation is when the car is moving backward while in forward gear, or forward while in reverse gear. Neither of these movements is at any time necessary or advantageous and either one may readily be the cause of serious accident, especially on steep grades.

My invention provides locking means between the clutch and the splined shaft, or propeller shaft, and it may be applied to the clutch gear, the countershaft, or the reverse idler, according to the convenience of installation in any given type of transmission of the spur gear type. With an unskilled or nervous driver, or possibly with a skilled driver, the killing of an engine on a grade sometimes allows the car to run backward and to go over a bank or the like before the driver can apply his brakes. To start the car under such conditions requires great skill and many manipulations. With my invention interposed in the manner indicated, it acts automatically and does not interfere with the starting of the car when stopped, any more than does a block placed under the rear wheels of a car headed upgrade.

In order to clearly explain my invention, I have illustrated the same on the accompanying sheet of drawings in which,—

Figure 1 is a vertical sectional view through a transmission mechanism in which my invention is embodied;

Figure 2 is a cross sectional view taken on line 2—2 of Fig. 1;

Figure 3 is a sectional view taken on line 3—3 of Fig. 1;

Figure 4 is a sectional view taken on line 4—4 of Fig. 3;

Figure 5 is a view of a slightly modified form of my invention; and

Figure 6 is a sectional view through said Fig. 5.

Referring more in detail to the drawings, my invention as here illustrated for descriptive purposes, comprises in combination with a spur gear transmission, designated as a whole A, a ratchet mechanism, as shown in Figs. 3 and 4, or as shown in Figs. 5 and 6. In Figs. 3 and 4, I have shown a ratchet mechanism comprising an outer ring $10^a$, with a plurality of pawls, $10^b$, pivotally mounted therein, and springs $10^c$ for normally moving said pawls inwardly against the inner notched ring $10^d$, mounted on the reverse idler shaft, 12, of the transmission mechanism. The notched ring, or hub-like member $10^d$, is shown as an extension of the hub portion of the reverse idler gear $10^e$. The pawls $10^b$ are shown of substantial width, as will be clear in Fig. 4. In Figs. 5 and 6, I have shown a roller ratchet mechanism, 11, an outer ring, $11^a$, being provided with eccentrically disposed runways, $11^b$, in which are placed rollers, $11^c$, which run on the periphery of a hub-like extension of the reverse idler gear 12', said hub-like extension being designated $11^d$. No matter which form of ratchet mechanism is used, they both function in the same manner. Ratchets in and of themselves, of course are old, just as are the gears and shafts, and my invention lies in the particular combination and its new arrangement whereby a simple safety device is made a part of the transmission mechanism without any important changes therein, and being located in a high speed portion of the driving mechanism of the car, may be comparatively small and light.

In the drawings, G, designates the low speed gear on the counter-shaft in a standard transmission; J designates the sliding gear which, when in mesh with gear G, gives low speed forward and when in mesh with gear $10^e$, gives reverse movement; and H designates a pinion on the counter shaft which is constantly in mesh with gear $10^e$, which is the reverse idler.

This constitutes the usual and well known selective type of transmission which includes a plurality of gear pairs of different ratios mounted on parallel shafts, one of which is driven from the source of power, with means consisting of sliding the gears, engaging and disengaging clutches, or moving keys, whereby only one of these pairs of gears may be in engagement at any given time. This is so common that further description thereof need not be given here. In all such gear mechanisms, the drive is from a gasoline engine which rotates invariably in one direction when delivering power, and reverse of the direction of movement of the car requires the provision of a third, or idler gear, called the reverse idler to give a contrary direction of rotation to the propeller shaft which transmits the power to the rear wheels. This involves as a necessity that certain gears and shafts in the transmission rotate invariably in one direction in all normal movements of the car. These gears and shafts comprise the clutch gear, the countershaft and the reverse idler, and are known usually and collectively as the constant gear train. The object of my invention is the provision of a simple locking device to prevent reverse rotation, at all times, of all the members of this train.

In many transmissions the idler gear $10^e$ already has the hub-like extension $10^d$ to serve as a spacing means, and I utilize this for one part of the ratchet mechanism which I embody in the transmission mechanism. For the outer member of the ratchet, I provide the outer ring or member $10^a$, and provide at one side thereof an extension $10^x$ which fits over the end of the countershaft 13, by which said outer ring member of the ratchet is held from turning. Thus I am able to provide in a space which is already available without reconstruction, a simple and practical means for preventing backward movement of an automobile in case the engine is stopped while the gears are set for forward drive and accomplish it in a comparatively inexpensive manner.

The use and operation of my invention as herein illustrated, may be briefly described as follows:

The notched ring $10^d$, on the reverse idler shaft 12, is surrounded by the outer ring $10^a$, having the pawls, $10^b$, pivotally mounted therein and engaging with said notched ring, with the extension $10^x$ connected with the end of the countershaft 13. The reverse idler is, therefore, free to turn in one direction but will be held against turning in the opposite direction by the pawls $10^b$ engaging with the notched ring $10^d$. Inasmuch as the reverse idler shaft must always turn in one direction when the transmission is set for normal movement, either forwardly or backwardly, it will be clear that the machine cannot be moved forwardly when set in reverse gear, or rearwardly when set in forward gear. This is true for the reason that the members of this gear train are always in engagement and rotate invariably in one direction, respectively, in all normal movements of the vehicle; that is, whether the vehicle is moving forwardly or backwardly. Reverse rotation of this gear train occurs only when the vehicle attempts to move backwardly while the gear shift is set for forward movement, or forwardly while the gear shift is set for reverse movement. Neither movement is every necessary or advantageous and either of such movements may be the cause of an accident when the vehicle is starting on a grade. My device operates when any such unnecessary movement starts by reason of the fact that the pawls at once lock the reverse idler and the entire gear train against such rotation. The operation of this device renders the control positive by limiting the movement of the vehicle absolutely to the direction determined by the setting of the gear shift lever. On account of the great ratio between the reverse idler and the rear wheels, the rotation of the notched ring $10^d$ at all ordinary speeds of the car is sufficient to hold the pawls $10^b$ out of engagement and there is not sufficient time for them to be moved inwardly between two passing notches, thus avoiding all noise.

Of course it is old to provide ratchet mechanism for preventing reverse rotation and I do not claim this, and I do not claim to be the first to undertake to prevent the backward movement of an automobile under the conditions mentioned, but, so far as I am aware, I am the first to provide an interlocking means interposed between the clutch and the propeller or drive shaft which operates automatically to prevent such backward movement. I do not, therefore, limit my invention to the details shown for illustrative purposes except as I may be limited by the hereto appended claims.

I claim:

1. In a motor vehicle, in combination with the transmission gears, idler shaft, counter shaft and gears thereon, of a fixed ratchet element around one of said shafts with means extending to the other shaft for holding it, a revolving ratchet element on said first mentioned shaft within said fixed ratchet element, and interlocking ratchet means between said fixed and revolving ratchet elements and adapted to prevent said elements from turning contrary to the direction for which they are set to turn.

2. In a motor vehicle and the transmission mechanism thereof, a fixed ratchet element through which two shafts of the transmission mechanism pass, a revolving ratchet element on one of said shafts, within said fixed ratchet element, and interlocking ratchet elements interposed between said fixed and said revolving ratchet elements.

3. In a motor vehicle, in combination with idler shaft and the counter shaft of the transmission mechanism, of a non-rotatable ratchet element around both shafts, and a revoluble ratchet element on one of said shafts within said non-rotatable ratchet element, and interlocking means between said ratchet elements arranged to prevent said elements from turning contrary to the direction for which they are set to turn.

Signed at Los Angeles, Los Angeles County, California, this 9th day of August, 1922.

GEORGE E. LYNCH